United States Patent [19]

Usami et al.

[11] Patent Number: 5,397,812
[45] Date of Patent: Mar. 14, 1995

[54] ADHESIVE COMPOSITION CONSISTING OF MICROCAPSULES CONTAINING COMPOUNDS DISPERSED IN A BINDER

[75] Inventors: Ikuzo Usami, Kanagawa; Makoto Kurihara, Akishima; Minami Hanada, Kawasaki; Kunihiko Nakajima, Machida, all of Japan

[73] Assignee: Three Bond Co., Ltd., Tokyo, Japan

[21] Appl. No.: 983,860

[22] PCT Filed: Jul. 6, 1992

[86] PCT No.: PCT/JP92/00856

§ 371 Date: Mar. 9, 1993

§ 102(e) Date: Mar. 9, 1993

[87] PCT Pub. No.: WO93/01421

PCT Pub. Date: Jan. 21, 1993

[30] Foreign Application Priority Data

Jul. 10, 1991 [JP] Japan .................... 3-195075

[51] Int. Cl.$^6$ .................... C09J 4/02; C09J 5/00; C09J 163/10; C08F 2/50
[52] U.S. Cl. .................... 522/13; 522/14; 522/24; 522/100; 522/103; 522/170; 522/182; 522/173; 522/175; 523/176
[58] Field of Search ............ 522/182, 170, 10, 65, 522/13, 14, 24, 100, 103, 173, 175; 523/176

[56] References Cited

U.S. PATENT DOCUMENTS

| 3,639,137 | 2/1972 | Marinelli | 117/26 |
| 3,746,068 | 7/1973 | Deckert et al. | 151/14.5 |
| 3,814,156 | 6/1974 | Bachmann et al. | 523/176 |
| 4,115,232 | 9/1978 | Nyi et al. | 522/65 |
| 4,325,985 | 4/1982 | Wallace | 523/176 |
| 4,632,944 | 12/1986 | Thompson | 522/11 |
| 4,836,878 | 6/1989 | Irving et al. | 523/176 |

FOREIGN PATENT DOCUMENTS

| 0077659 | 4/1983 | European Pat. Off. |
| 0409419 | 1/1991 | European Pat. Off. |
| 2073610 | 10/1981 | United Kingdom |

*Primary Examiner*—Susan W. Berman
*Attorney, Agent, or Firm*—Oblon, Spivak, McClelland, Maier & Neustadt

[57] ABSTRACT

An adhesive composition for being applied to at least one of thread contact faces of screw members so as to stick said thread contact faces to each other in engaging the screw members with each other for the purpose of locking and sealing the engaged screw members, in which micro-capsules enclosing at least a reactive monomer of a reactive adhesive composition comprising said monomer, a polymerization initiator of the aforesaid monomer and/or an activator of the aforesaid polymerization initiator is dispersed in a binder comprising a photo-hardening resin composition.

6 Claims, No Drawings

ADHESIVE COMPOSITION CONSISTING OF MICROCAPSULES CONTAINING COMPOUNDS DISPERSED IN A BINDER

RELEVANT TECHNICAL FIELD

This invention relates to an adhesive composition for being applied to the thread contact face (screw threads) of a screw member such as a screw, bolt and nut for the purpose of locking and sealing up the screw members engaged with each other.

BACKGROUND OF THE ART

There have been conventionally known a variety of adhesive compositions for being applied to the thread contact face of a screw, bolt, nut or the like for the purpose of locking and sealing up such screw members engaged with each other. As to the conventional adhesive compositions, slurry-like liquefied or paste-like adhesive compositions made by dispersing micro-capsules enclosing a reactive adhesive and a resin serving as a binder in an organic solvent or water are disclosed in Japanese Pat. Publication SHO 45-11051(B), Japanese Pat. Publication SHO 54-1737(B), Japanese Pat. Publication SHO 52-46339(B), Japanese Pat. Appln. Public Disclosure SHO 1-27684(A), and Japanese Pat. Appln. Public Disclosure SHO 1-128918(A).

These adhesive compositions are aimed at strengthening the mutual adhesive force of the screw members by destroying the micro-capsules when engaging the screw members to permit the adhesive to flow out of tile micro-capsules.

However, these adhesive compositions with which the thread contact faces of the screw members are coated are required to be dried. Thus, if the adhesive composition contains an organic solvent, it entails a sanitary problem of generating the gas of the organic solvent in a drying process.

Furthermore, in the case of using the composition containing water, the drying process which is carried out at an ordinary temperature takes much time, and therefore, requires heating treatment, thereby leading to a problem of losing the stability in preservation of the reactive adhesive contained in the micro-capsules.

On the other hand, Japanese Patent Publication HEI 3-8393 discloses an adhesive composition with the object of carrying out the drying process at room temperature for a short time, which composition is made by adding, to a binder such as a monomer or oligomer of a photo-hardening resin which hardens by the action of radiation of ultra-violet rays or the like, micro-capsules containing an opaque filler, a photo-initiator which starts polymerization of the monomer or oligomer when exposing the monomer or oligomer to the radiation, and the polymer thus obtained or its free-radical polymerization initiator which starts polymerization of the oligomer and/or its activator.

Since this adhesive composition has the opaque filler contained in the binder composed of the photo-hardening resin, the radiation such as ultraviolet rays does not reach deep inside the binder, and therefore, only the surface part of the binder which is exposed with the ultraviolet rays is polymerized by the photo-initiator. In this state, only the surface part of the adhesive composition is hardened in the form of a film with the inside part kept in its paste state containing the micro-capsules.

That is to say, the adhesive applied to the thread contact face has its inside part kept in its paste state covered with a film layer. Therefore, the tightening resistance generated when thrusting a screw member into its counterpart at the outset lessens. By further screwing up, the micro-capsules are broken to cause the polymerization initiator or its activator to flow out of the micro-capsules so as to subject the polymer, oligomer, and monomer to polymerization reaction with the polymerization initiator or its activator. Consequently, the effects of sticking and sealing up the screw members are heightened.

However, if the thread contact face of the screw member is left coated with the aforenoted adhesive composition for a long time, a part yet to be hardened of the adhesive composition will be hardened owing to sunlight or heat. This adhesive composition entails a disadvantage such that, even when the polymerization initiator or its activator comes out by tightening up the screw member to break the micro-capsules, no polymerization reaction takes place, and consequently, the effects of sticking and sealing up the screw members cannot be brought about.

In addition, since the aforesaid film contains an inorganic filler, it is disadvantageously fragile, so that a paste-like part yet to be hardened of the adhesive composition may come out when carrying the screw member such as a bolt in the stage of distribution.

DESCRIPTION OF THE INVENTION

In light of the above, this invention provides an adhesive composition for being applied to at least one of thread contact faces of screw members so as to stick said thread contact faces to each other in engaging the screw members with each other, which is characterized in that micro-capsules enclosing at least a reactive monomer of a reactive adhesive composition comprising said reactive monomer, polymerization initiator of said monomer and an activator of the aforementioned polymerization initiator, which is added at need, is dispersed in a binder comprising a photo-hardening resin composition.

PREFERRED MODES FOR EXECUTING THE INVENTION

One embodiment of the adhesive composition according to this invention will be described hereinafter.

The adhesive composition according to this invention includes: (1) an adhesive composition in which micro-capsules separately containing a reactive monomer and a polymerization initiator are dispersed in a binder comprising a photo-hardening resin composition, (2) an adhesive composition in which micro-capsules containing a reactive monomer and a polymerization initiator and micro-capsules containing an activator are dispersed in a binder comprising a photo-hardening resin composition, (3) an adhesive composition in which micro-capsules containing a reactive monomer and a polymerization initiator and micro-capsules containing a reactive monomer and its activator are dispersed in a binder comprising a photo-hardening resin composition, (4) an adhesive composition in which micro-capsules containing a reactive monomer and a polymerization initiator are dispersed together with an activator in a binder comprising a photo-hardening resin composition, (5) an adhesive composition in which micro-capsules containing a reactive monomer and its activator and micro-capsules containing a polymerization initiator are dispersed in a binder comprising a photo-hardening resin composition, (6) an adhesive composition in which micro-capsules containing a reactive monomer and its activator are dispersed together with a polymerization initiator in a binder comprising a polymerization initiator in a binder comprising a photo-hardening resin composition, and (7) an adhesive composition in which micro-capsules containing a reactive monomer are dispersed together with a polymerization initiator and/or its activator in a binder comprising a photo-hardening resin composition.

Also, in place of the photo-hardening resin composition mixed with the polymerization initiator or its activator as noted above, a photo-hardening resin composition containing a functional group of a polymerization initiator or its activator may be used. For instance, a photo-hardening resin composition containing an amino group can be used.

As the reactive monomer used herein, there can be enumerated a reactive vinyl monomer or its oligomer, preferably an acrylic ester monomer or its oligomer, or a methacrylic ester monomer or its oligomer. Also, an epoxy resin can be used.

As the polymerization initiator of the reactive monomer, a radical generator, e.g. peroxide such as benzoyl peroxide can be used in a case that the monomer is an acrylic adhesive agent. As the activator of the polymerization initiator, there are amine serving as a redox catalyst of the peroxide or salicylic acid derivative.

In a case that the monomer is an epoxy adhesive agent, amine and salicylic acid may be enumerated as the polymerization initiator of the monomer.

On the other hand, the photo-hardening resin composition used as a binder is obtained by adding a photo-initiator to the well-known resin which is hardened by ultraviolet rays.

By way of example, there may be enumerated (1) a composition in which a reactive vinyl monomer, preferably an acrylic ester monomer or methacrylic ester, contains a photo-polymerization initiator such as benzophenone, and (2) a composition in which an epoxy resin contains a photo-polymerization initiator such as onium salt.

Moreover, various kinds of reactive vinyl monomers, epoxy resins and photo-polymerization initiators have been known, and should not be understood as limitative in this invention.

Also, an adhesive composition capable of reducing the resistance involved in tightening up the engaged screw members can be produced by using a photo-hardening resin serving as a binder, such as flexible or rubber-like elastic material. Instead, if a resin having a high glass transition temperature is used, an adhesive composition having great heat-resistance can be produced.

The ratio of the binder composed of the photo-hardening resin to the micro-capsules in the reactive adhesive according to this invention is 70% or less in the total amount of the adhesive composition of this invention. If it is over 70%, sufficient adhesive power cannot be obtained.

According to this invention, a filler, lubricating agent, and/or coupling agent can be added to the adhesive composition to provide chemical resistance, high adhesive power, and good lubricating properties.

As is plain from the foregoing, according to this invention, since at least the monomer in the reactive adhesive components is enclosed in the micro-capsules, polymerization reaction is achieved by the action of the polymerization initiator or its activator when the micro-capsules are broken by tightening up the engaged screw members applied with the adhesive composition to cause the monomer to come out of the micro-capsules. Thus, locking and sealing-up of the engaged screw members can be fulfilled reliably.

In addition, since the photo-hardening resin composition is used as a binder, the thread contact faces of the screw members can be coated in a short time with the binder including the micro-capsules and soon hardened by being exposed to radiation such as ultraviolet rays at room temperature without being heated. Thus, the adhesive composition of this invention is advantageous from the standpoint of sanitation because it contains no organic solvent, and it does not damage the preservation and stability of the reactive adhesive agent in the micro-capsules because it is not subjected to heat treatment, thereby to enable the screw members to be stuck to each other at a low cost.

Moreover, since the photo-hardening resin composition serving as a binder is completely hardened to preserve and stabilize the micro-capsules, a paste-like part yet to be hardened of the adhesive composition does not come out of the micro-capsules when carrying the screw member applied with the adhesive composition in the stage of distribution. Besides, the resistance generated in tightening up the engaged screw members can be maintained uniform, the scattering in tightening force of the screw members can be eliminated.

The embodiments of this invention will be described hereinafter.

EMBODIMENTS 1-3

A processed bolt was obtained by being applied with an adhesive composition obtained by mixing, at the ratio shown in the following Table 1, and dispersing micro-capsules #1 [capsules enclosing bisphenol A dimethacrylate and a radical generator], micro-capsules #2 [capsules enclosing bisphenol A dimethacrylate and DMPT (N,N-dimethyl-P-toludine: activator)] in THREE BOND 3057D [UV-hardening acrylic resin containing photo-polymerization initiator made by THREE BOND CO., LTD.], and then, being exposed to UV rays (integral dose: 600 mJ/cm$^2$).

The bolt thus obtained was provided with two flat washers and tightened up in a nut with 29.4 N.m. Then, the breaking torque was measured after the bolt was held tightened for 24 hours at room temperature.

Comparative Example 1

The breaking torque of an unprocessed bolt provided with two flat washers and engaged with a nut was measured by tightening up the bolt with 29.4 N.m.

EMBODIMENTS 4-5

The breaking torque was measured in the same manner as those in Embodiments 1-3 noted above, using an adhesive composition obtained by mixing THREE BOND 3057D with the micro-capsules #1 mentioned above, an activator [salicylic acid derivative and DMPT (N,N-dimethyl-P-toluidine)] at the ratio shown in the following Table 1.

EMBODIMENT 6

There was used a bolt applied with an adhesive composition obtained by mixing THREE BOND 3057D with the micro-capsules #3 [capsules enclosing bisphenol A epoxy resin], aromatic diamine [polymerization initiator made by NIPPON KAYAKU CO., LTD.] and a salicylic acid derivative (activator) at the ratio shown in the following Table 1. The breaking torque was measured by tightening up the bolt in the same manner as those in Embodiments 1–3 except that the bolt was held tightened at room temperature for 72 hours.

EMBODIMENT 7

The breaking torque was measured in the same manner as those in Embodiments 1–3 except that SINX (UV-hardening epoxy resin containing a photo-polymerization initiator made by THREE BOND CO., LTD.) was used as a binder.

EMBODIMENT 8

The breaking torque was measured in the same manner as that in Embodiment 4 except that SINX was used as a binder.

EMBODIMENT 9

The breaking torque was measured in the same manner as that in Embodiment 6 except that dialkylaminoacrylamide (UV-hardening epoxy polymerization initiator) and DAROCURE 1173 (photo-polymerization initiator made by MERCK JAPAN LTD.) were used as a binder. The measured breaking torque data obtained in the aforementioned Embodiments and Comparative Examples will be shown in Table 1 below. In Table 1, the component A means a component for forming a coating film, and the component B means a component serving as an adhesive agent.

quently to obtain a good result as shown in Table 2 below.

TABLE 2

| Conditions | Breaking Torque (N · zm) |
| --- | --- |
| Blank | 33.6 |
| Left outdoors for 1 month | 33.5 |
| 40° C. × 1 month | 33.6 |

INDUSTRIAL APPLICABILITY

Since at least the reactive monomer in the reactive adhesive components is enclosed in the micro-capsules, polymerization reaction is achieved by-the action of the polymerization initiator or its activator when the micro-capsules are broken by tightening up the engaged screw members applied with the adhesive composition to cause the monomer to come out of the micro-capsules. Thus, locking and sealing-up of the engaged screw members can be fulfilled reliably.

We claim:

1. An adhesive composition for application to at least one threaded face of contacting screw members in order to fixedly adhere the threaded contacting faces of the screw members which engage each other, which consists of microcapsules, which enclose (1) reactive monomers consisting of at least one acrylic ester monomer, an oligomer of the acrylic ester monomer, a methacrylic ester monomer or an oligomer of said methacrylic ester monomer, and (2) a peroxide serving as a

TABLE 1

| | | | Embodiment 1 | Embodiment 2 | Embodiment 3 | Comparative Example 1 |
| --- | --- | --- | --- | --- | --- | --- |
| Binder | Photo-hardening resins | THREE BOND3057D (UV-hardening acrylic resin made by THREE BOND CO., LTD.) | 70 | 50 | 30 | — |
| Capsules enclosing: | Polymerization initiator | Micro-capsules #1 (enclosing Bisphenol A dimethacrylate + Radical generator) | 15 | 25 | 30 | — |
| | Activator | Micro-capsules #2 (enclosing Bisphenol A dimethacrylate + DMPT) | 15 | 25 | 30 | — |
| | | Breaking torque (N · m) | 31.1 | 33.6 | 35.1 | 23.5 |

| | | | Embodiment 4 | Embodiment 5 | Embodiment 6 | Embodiment 7 | Embodiment 8 | Embodiment 9 |
| --- | --- | --- | --- | --- | --- | --- | --- | --- |
| Binder | Photo-hardening resins | THREE BOND3057D (UV-hardening acrylic resin made by THREE BOND CO., LTD.) | 50 | 50 | 50 | — | — | — |
| | Photo-hardening resins | SINX (UV-hardening epoxy resin made by THREE BOND CO., LTD.) | — | — | — | 50 | 50 | — |
| | Photo-hardening resins | Dialkylamino-acrylamide (UV-hardening epoxy polymerization initiator) | — | — | — | — | — | 50 |
| | | DAROCURE1173 (Photo-initiator made by MERCK JAPAN LTD.) | — | — | — | — | — | 1 |
| | Activator | DMPT (N,N-dimethyl-P-toluidine) (Acrylic polymerization activator) | — | 1 | — | — | — | — |
| | | Salicyic acid derivative (acrylic resin + Epoxy polymerization initiator) | 2 | — | 2 | — | 2 | — |
| | Polymerization initiator | Aromatic diamine (epoxy resin made by Nippon Kayaku CO., LTD.) | — | — | 15 | — | — | — |
| Capsules enclosing | Polymerization initiator | Micro-capsules = 1 (enclosing Bisphenol A dimethacrylate + Radical generator) | 50 | 50 | — | 25 | 50 | — |
| | Primary components | Micro-capsules = 3 (enclosing Bisphenol A epoxy resin) | — | — | 50 | — | — | 50 |
| | Activator | Micro-capsules = 2 (enclosing Bisphenol A dimethacrylate + DMPT) | — | — | — | 25 | — | — |
| | | Breaking torque (N · m) | 36.8 | 35.5 | 51.0 | 38.2 | 41.7 | 53.7 |

Test of preservation and stability

After a bolt coated with the adhesive composition used in Embodiment 2 was left outdoors for one month and further left in an atmosphere at 40° C. for one month, the bolt was provided with two flat washers and kept tightened with 29.4 N.m for 24 hours. Thereafter, the breaking torque thereof was measured, consepolymerization initiator for said monomers, dispersed in (3-1) a binder consisting of acrylic ester monomers or methacrylic ester monomers as a photohardening resin composition and a photopolymerization initiator for said monomers or (3-2) a binder consisting of epoxy resins and photopolymerization initiator for the epoxy resin with (4) an amine or salicylic acid derivative which serves as an activator for said peroxide, said binder being completely hardened when external light penetrates therethrough, thereby fixing the microcapsules in the hardened binder.

2. The adhesive composition of claim 1, wherein said amine is N,N-dimethyl-p-toluidine, and said microcapsules enclose a mixture of said amine and acrylic ester monomer which are dispersed in said binder.

3. The adhesive composition of claim 1, wherein the amount of binder in the adhesive composition is no more than 70% of the total weight of components of the adhesive composition.

4. An adhesive composition for application to at least one threaded face of contacting screw members in order to fixedly adhere the threaded contacting faces of the screw members which engage each other, which consists of microcapsules, which enclose (1) reactive monomers consisting of at least one acrylic ester monomer, an oligomer of the acrylic ester monomer, a methacrylic ester monomer or an oligomer of the methacrylic ester monomer and (2) peroxides serving as a polymerization initiator for said monomers, dispersed in (3) a binder consisting of acrylic ester monomers or methacrylic ester monomers having an amino group, said monomers being a photohardening resin composition, and (4) a photopolymerization initiator, said binder being completely hardened when external light penetrates therethrough, thereby fixing the microcapsules in the hardened binder.

5. An adhesive composition for application to at least one threaded face of contacting screw members in order to fixedly adhere the threaded contacting faces of the screw members which engage each other, which consists of (1) microcapsules, which enclose an epoxy resin, dispersed in (2) a binder consisting of an amine or salicylic acid derivative which serves as an activator for said epoxy resins and (3) acrylic ester monomers or methacrylic ester monomers, which are a photohardening resin composition, and (4) a photopolymerization initiator for said monomer, said binder being completely hardened when external light penetrates therethrough, thereby fixing the microcapsules in the hardened binder.

6. An adhesive composition for application to at least one threaded face of contacting screw members in order to fixedly adhere the threaded contacting faces of the screw members which engage each other, which consists of (1) microcapsules, which enclose an epoxy resin, dispersed in (2) a binder consisting of acrylic ester monomers or methacrylic ester monomers having an amino group, the monomers being a photohardening resin composition, and (4) a photopolymerization initiator for said monomers, said binder being completely hardened when external light penetrates therethrough, thereby fixing the microcapsules in the hardened binder.

* * * * *